(12) United States Patent
Mackinlay et al.

(10) Patent No.: US 6,256,649 B1
(45) Date of Patent: *Jul. 3, 2001

(54) ANIMATED SPREADSHEET FOR DYNAMIC DISPLAY OF CONSTRAINT GRAPHS

(75) Inventors: Jock D. Mackinlay, Palo Alto; Bay-Wei Chang, Foster City; Polle T. Zellweger, Palo Alto, all of CA (US); Takeo Igarashi, Chigasaki (JP); Gregory Niemeyer, Redwood City, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/098,903

(22) Filed: Jun. 17, 1998

(51) Int. Cl.⁷ .................................................. G06F 17/21
(52) U.S. Cl. .......................................... 707/503; 345/473
(58) Field of Search .................................. 707/503, 501, 707/509, 538, 8, 104; 345/440, 473

(56) References Cited

U.S. PATENT DOCUMENTS

| | | | |
|---|---|---|---|
| 4,495,491 | 1/1985 | Postl | 340/709 |
| 4,517,660 | 5/1985 | Fushimoto et al. | 364/708 |
| 4,528,561 | 7/1985 | Kitamura | 340/745 |
| 4,616,336 | 10/1986 | Robertson et al. | 364/900 |
| 5,049,862 | 9/1991 | Dao et al. | 340/706 |
| 5,055,998 | 10/1991 | Wright et al. | 364/200 |
| 5,093,907 | 3/1992 | Hwong et al. | 395/152 |
| 5,095,429 | 3/1992 | Harris et al. | 364/408 |
| 5,142,669 | 8/1992 | Inoue et al. | 395/157 |
| 5,146,592 | 9/1992 | Pfeiffer et al. | 395/157 |
| 5,220,649 | 6/1993 | Forcier | 395/148 |
| 5,231,577 | 7/1993 | Koss | 364/419 |
| 5,231,578 | 7/1993 | Levin et al. | 364/419 |
| 5,245,702 | 9/1993 | McIntyre et al. | 395/164 |
| 5,371,675 | 12/1994 | Greif et al. | 364/419.1 |
| 5,375,201 | * 12/1994 | Davoust | 707/503 |
| 5,416,895 | 5/1995 | Anderson et al. | 395/148 |
| 5,434,965 | 7/1995 | Matheny et al. | 395/159 |
| 5,459,488 | 10/1995 | Geiser | 345/173 |
| 5,550,563 | * 8/1996 | Matheny et al. | 345/168 |
| 5,550,964 | * 8/1996 | Davoust | 345/440 |
| 5,577,188 | 11/1996 | Zhu | 395/326 |
| 5,581,681 | 12/1996 | Tchao et al. | 395/804 |
| 5,596,700 | 1/1997 | Darnell et al. | 395/340 |
| 5,621,871 | * 4/1997 | Jeremko et al. | 345/441 |
| 5,625,833 | 4/1997 | Levine et al. | 395/800 |
| 5,632,009 | * 5/1997 | Rao et al. | 707/509 |
| 5,634,095 | 5/1997 | Wang et al. | 395/326 |
| 5,739,824 | * 4/1998 | Dietrich et al. | 345/440 |
| 5,838,938 | * 11/1998 | Morgan | 345/328 |

OTHER PUBLICATIONS

Alexander, J.; Asmuth, C.; Winarsky, N. "The Sarnoff Data Analysis and Visualization Project." *SPIE*; vol. 1259; Extracting Meaning from Complex Data: Processing, Display, Interaction (1990); pp. 50–60.

Brown, P.J. "Turning Ideas into Products: The Guide System." *Hypertex '87 Papers*; Nov. 1987; pp. 33–40.

Phelps, T.A.; Wilensky, R. "Multivalent Annotations." Published in Proceedings of the First European Conference on Research and Advanced Technology for Digital Libraries; Sep. 1–3, 1997, Pisa, Italy. pp. 1–18.

Shneiderman, B. "User interface design for the Hyperties electronic encyclopedia." *Hypertex '87 Papers*; Nov. 1987; pp. 189–194.

* cited by examiner

Primary Examiner—Joseph H. Feild

(57) ABSTRACT

An augmented spreadsheet presentation provides for selecting a region of user focus in a primary body of data displayed as an array of cells, with two or more displayed cells of the array of cells being logically linked by a constraint graph. Two or more displayed cells can be linked by color or symbol animations in response to selected user focus with a mouse or other cursor. Complex animations that successively illustrate multiple constraint graph paths are possible.

14 Claims, 17 Drawing Sheets

|   | A | B | C | D | E | F |
|---|---|---|---|---|---|---|
| 0 | 20 | 180 | 300 | 20 | 520 | |
| 1 | 0 | 200 | 120 | 10 | 330 | |
| 2 | 10 | 220 | 90 | 40 | 360 | |
| 3 | 20 | 100 | 100 | 0 | 220 | |
| 4 | 30 | 0 | 80 | 10 | 120 | |
| 5 | 80 | 700 | 690 | 80 | 1550 | |
| 6 | | | | | | |
| 7 | | | | | 1000 | |
| 8 | | | | | 550 | |
| 9 | | | | | | |

FIG. 4

|   | A | B | C | D | E | F |
|---|---|---|---|---|---|---|
| 0 | 20 | 180 | 300 | 20 | 520 SUM(A0:D0) | |
| 1 | 0 | 200 | 120 | 10 | 330 SUM(A1:D1) | |
| 2 | 10 | 220 | 90 | 40 | 360 SUM(A2:D2) | |
| 3 | 20 | 100 | 100 | 0 | 220 SUM(A3:D3) | |
| 4 | 30 | 0 | 80 | 10 | 120 SUM(A4:D4) | |
| 5 | 80 SUM(A0:A4) | 700 SUM(B0:B4) | 690 SUM(C0:C4) | 80 SUM(D0:D4) | 1550 SUM(E0:E4) | |
| 6 | | | | | 1000 | |
| 7 | | | | | 550 E5-E7 | |
| 8 | | | | | | |
| 9 | | | | | | |

FIG. 6

|   | A | B | C | D | E |
|---|---|---|---|---|---|
| 0 | 20 | 180 | 300 | 20 | 520 |
| 1 | 0 | 200 | 120 | 10 | 330 |
| 2 | 10 | 220 | 90 | 40 | 360 |
| 3 | 20 | 100 | 100 | 0 | 220 |
| 4 | 30 | 0 | 80 | 120 | |
| 5 | 80 | 700 | 690 | 1550 | |
| 6 | | | | | 1000 |
| 7 | | | | | 550 |

FIG. 8

|   | A | B | C | D | E | F |
|---|---|---|---|---|---|---|
| 0 | 20 | 180 | 300 | 20 | 520 SUM(A0:D0) | |
| 1 | 0 | 200 | 120 | 10 | 330 SUM(A1:D1) | |
| 2 | 10 | 220 | 90 | 40 | 360 SUM(A2:D2) | |
| 3 | 20 | 100 | 100 | 0 | 220 SUM(A3:D3) | |
| 4 | 30 | 0 | 80 | 10 | 120 SUM(A4:D4) | |
| 5 | 80 SUM(A0:A4) | 700 SUM(B0:B4) | 690 SUM(C0:C4) | 80 SUM(D0:D4) | 1550 SUM(E0:E4) | |
| 6 | | | | | 1000 | |
| 7 | | | | | 550 E5-E7 | |
| 8 | | | | | | |
| 9 | | | | | | |

FIG. 9

|   | A | B | C | D | E | F |
|---|---|---|---|---|---|---|
| 0 | 20 | 180 | 300 | 20 | 520 | |
| 1 | 0 | 200 | 120 | 10 | 330 | |
| 2 | 10 | 220 | 90 | 40 | 360 | |
| 3 | 20 | 100 | 100 | 0 | 220 | |
| 4 | 30 | 0 | 80 | 10 | 120 | |
| 5 | 80 | 700 | 690 | 80 | 1550 | |
|   | SUM(A0:A4) | SUM(B0:B4) | SUM(C0:C4) | SUM(D0:D4) | SUM(E0:E4) | |
| 6 | | | | | | |
| 7 | | | | | 1000 | |
| 8 | | | | | 550 | |
|   | | | | | E5-E7 | |
| 9 | | | | | | |

Row 0 E cell: SUM(A0:D0); Row 1 E: SUM(A1:D1); Row 2 E: SUM(A2:D2); Row 3 E: SUM(A3:D3); Row 4 E: SUM(A4:D4)

*FIG. 10*

|   | A | B | C | D | E | F | G |
|---|---|---|---|---|---|---|---|
| 0 | | | | | 52 | | |
| 1 | | | | | 33 | | |
| 2 | | | | | 36 | | |
| 3 | | | | | 22 | | |
| 4 | | | | | 12 | | |
| 5 | 8 | 70 | 69 | 8 | 155 | | |
| 6 | | | | | | | |
| 7 | | | | | | | |

FIG. 13

|   | A | B | C | D | E | F | G |
|---|---|---|---|---|---|---|---|
| 0 | 2 | 18 | 30 | 2 | 52 | | |
| 1 | | | | | 33 | | |
| 2 | | | | | 36 | | |
| 3 | | | | | 22 | | |
| 4 | | | | | 12 | | |
| 5 | 8 | 70 | 69 | 8 | 155 | | |
| 6 | | | | | | | |
| 7 | | | | | | | |

FIG. 14

|   | A | B | C | D | E | F | G |
|---|---|---|---|---|---|---|---|
| 0 |   |   |   |   | 52 |   |   |
| 1 |   |   |   |   | 33 |   |   |
| 2 |   |   |   |   | 36 |   |   |
| 3 |   |   |   |   | 22 |   |   |
| 4 |   |   |   |   | 12 |   |   |
| 5 | 8 | 70 | 69 | 8 | 155 |   |   |
| 6 |   |   |   |   |   |   |   |
| 7 |   |   |   |   |   |   |   |

*FIG. 15*

|   | A | B | C | D | E | F | G |
|---|---|---|---|---|---|---|---|
| 0 | 2 |   |   |   | 52 |   |   |
| 1 | 0 |   |   |   | 33 |   |   |
| 2 | 1 |   |   |   | 36 |   |   |
| 3 | 2 |   |   |   | 22 |   |   |
| 4 | 3 |   |   |   | 12 |   |   |
| 5 | 8 | 70 | 69 | 8 | 155 |   |   |
| 6 |   |   |   |   |   |   |   |
| 7 |   |   |   |   |   |   |   |

*FIG. 16*

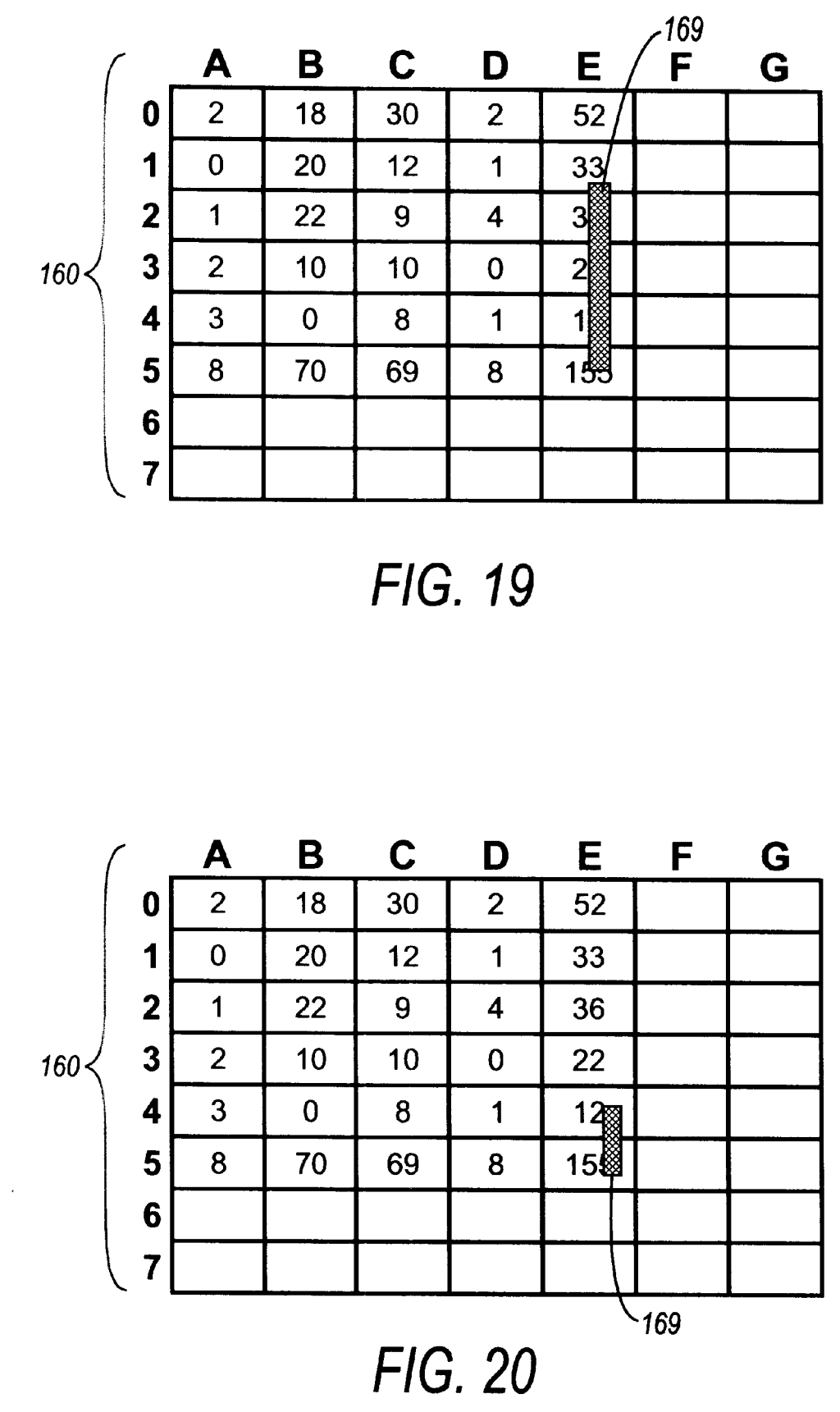

|   | A | B | C | D | E | F | G |
|---|---|---|---|---|---|---|---|
| 0 | 2 | 18 | 30 | 2 | 52 | | |
| 1 | 0 | 20 | 12 | 1 | 33 | | |
| 2 | 1 | 22 | 9 | 4 | 3 | | |
| 3 | 2 | 10 | 10 | 0 | 2 | | |
| 4 | 3 | 0 | 8 | 1 | 1 | | |
| 5 | 8 | 70 | 69 | 8 | 155 | | |
| 6 | | | | | | | |
| 7 | | | | | | | |

FIG. 19

|   | A | B | C | D | E | F | G |
|---|---|---|---|---|---|---|---|
| 0 | 2 | 18 | 30 | 2 | 52 | | |
| 1 | 0 | 20 | 12 | 1 | 33 | | |
| 2 | 1 | 22 | 9 | 4 | 36 | | |
| 3 | 2 | 10 | 10 | 0 | 22 | | |
| 4 | 3 | 0 | 8 | 1 | 12 | | |
| 5 | 8 | 70 | 69 | 8 | 155 | | |
| 6 | | | | | | | |
| 7 | | | | | | | |

FIG. 20

ANIMATED SPREADSHEET FOR DYNAMIC DISPLAY OF CONSTRAINT GRAPHS

CROSS REFERENCE TO RELATED APPLICATIONS

The present application is related to commonly assigned U.S. patent application Ser. No. 09/098,904 entitled "SPREADSHEET VIEW ENHANCEMENT SYSTEM" which was filed on Jun. 17, 1998.

FIELD OF THE INVENTION

The present invention relates to display of computer spreadsheets. More particularly, the present invention relates to user controlled display of supplementary constraint graph information and spreadsheet cell relationships in a computer spreadsheet.

BACKGROUND AND SUMMARY OF THE INVENTION

Electronic spreadsheets for organizing and creating multidimensional arrays of financial information are widely employed. Typically, an electronic spreadsheet displays a table of cells arranged into rows and columns, with each cell containing associated numeric data that can be readily modified by a user. The user can define various mathematical or logical relationships (commonly known as "functions" or "formulas") between each cell, or rows and columns of cells, forming a constraint graph that limits possible cell content. For example, Cell (C) can be constrained to display the additive product of Cell (A) and Cell (B), making Cell (C) have a displayed value of 7 if Cell (A) displays a value of 3 and Cell (B) displays a value of 4. If a user changes the value of Cell (A) from 3 to 5, the displayed value of Cell (C) is recalculated, changing to 9 in accordance with the constraint graph formula Cell (C)=Cell (A)+Cell (B).

Typically the displayed layout of the spreadsheet provides cues about the underlying formulas and structure of the constraint graph, with adjacent cells often being additively or subtractively related as is standard practice for conventional paper based accounting spreadsheets. However, for certain applications it is often desirable to define complex constraint graphs that do not have a simple tabular layout. To understand such spreadsheets, substantial annotation is required, or users must explore the individual cells of the spreadsheet to find and read the cell formulas that together form the spreadsheet constraint graph. Unfortunately, this is a cognitively difficult task when available layout cues mislead a user, the spreadsheet is large, or the intercell relationships and formulas forming the constraint graph are complex.

As will be appreciated, various attempts have been made to enhance explanatory power of a spreadsheet. For example, Excel 97™, a spreadsheet available from Microsoft Corp., can provide a limited visualization of the constraint graph for a given cell. When a cell is selected with a mouse cursor, its corresponding formula is displayed in a separate "formula bar". When the formula bar is clicked, the cells that take part in the formula are highlighted with a colored border. The color of the cell border is matched with the color of the cell reference in the formula. These color rectangles can be moved and adjusted to edit the corresponding formula. However, Microsoft Excel 97™ can only show the incoming constraints for a single cell at one time. To look at the relationships for another cell, you must click on the new cell, at which time the former cell's constraints become invisible.

What is needed are methods for effectively displaying additional constraint graph information for spreadsheets. Such constraint graph information can include static presentations, animated presentation, or presentations based on various coloration or shading techniques. Accordingly, the present invention provides a method for dynamically presenting both a primary body of data displayable on a screen and constraint data that in part defines the primary body of data. When a region of user focus is selected in the primary body of data, additional constraint data is dynamically displayed (as long as user focus is maintained) and individual data elements present in the primary body of data are concurrently modified to enhance presentation of the constraint data. When user focus changes, the presentation of constraint data can lapse, with the primary body of data reverting to its original display format.

As will be appreciated, the primary body of data subject to constraint is typically numeric, while constraint data can be primarily textual, primarily graphical, or some mixture of textual and graphical elements. Typically, the constraint data is transiently invoked by selecting (with mouse or keyboard cursor) a particular cell of a spreadsheet as a user focus, with relevant constraint data or data flow paths being statically or dynamically generated to augment the displayed spreadsheet. In certain applications, the cell layout, text size, or other spatial characteristics of the primary body of data can be adjusted to accommodate newly presented constraint data. Alternatively, cells can be gradient colored to indicate data. The appropriated user focus can be determined by tracking the position of conventional screen displayed mouse or keyboard controlled pointers, by use of touch sensitive overlays to a screen, eye or head tracking systems, or any other conventional mechanism for reliably determining a region of a screen display. Initiating dynamic display of supporting constraint data at the user focus can be in response to user initiated mouse clicks, keyboard input, finger taps, duration (e.g. mouse cursor held still on or adjacent to an annotation tag for greater than two seconds), or any other suitable input scheme for confirming a user desire to view supporting bodies of data.

In addition to color coding, animations, lines, or other graphical elements, supplementary information related to the primary body of data can be presented by addition of various annotation tags. Contemplated annotation tags include numeric formulas positioned in a corner of a cell, greeked or unreadably small interlinear or marginal text, symbols (e.g. an asterisk) or thumbnail graphics or drawings in the margin. In certain preferred applications, the annotation tags can be very small, yet still readable, spreadsheet constraint formulas. In other applications, lines, curves, or graphical or textual animations can allow a user reviewing a primary body of data to identify the availability of supporting data. While typically a visual cue, in certain applications the annotation tag can be visually imperceptible to the user until a pointer or other indicator of user focus is directed at a region about the annotation tag. In certain applications, annotation tags can be based on auditory or tactile feedback, with, for example, sound, operation of force feedback mice, or tactile displays providing audio or tactile annotations.

For best results, accommodating annotations or constraint data requires "negotiations" with the primary body of data to determine suitable adjustments to position, orientation, sizing, coloring, or other typographical or graphical characteristics of the primary body of data. Negotiated accommodation overcomes a major problem associated with conventional hypertext window or "balloon help" techniques. Such annotation techniques simply overlay a small graphic or window over a primary body of data, often covering necessary information in the primary body of data. In contrast, the present invention conducts a negotiation between the primary body of data and the annotation or constraint data to determine how the primary body of data, the annotation, or the constraint data can be positioned, moved, resized, or otherwise altered to best retain a user view of salient portions of the primary body of data, while still allowing viewing of the constraint data.

Accommodation of the constraint data or presentation of annotations on the spreadsheet can be through overlay or spatial morphing of the primary body of data. An overlay presentation identifies the annotated region of the primary body by suitable callouts, lines, markers, or animations that place the annotation in the margin, interline, or interparagraph region, but still direct a user's attention to the related region of the primary body. Alternatively, the region of the primary body subject to annotation can be identified by a color or font change. This allows, for example, a specific region of the primary body to be "grayed out" or faded, with the supporting data of the annotation positioned to lay on top of the grayed out region. Overlay presentations generally do not require repositioning cells or graphical elements in the spreadsheet, instead relying on available spaces (e.g. either "empty" marginal space or space created by "graying out" text) in the spreadsheet.

In contrast, spatial morphing of the primary body of data generally requires displacement or differential resizing of lines and words in a vicinity of an annotation tag subject to user focus. The position of words, lines, paragraphs, or graphical elements in the primary body of data adjust (using an animated transition) as needed to accommodate the constraint data. This allows constraint data or annotations to be presented at full readable size, while still retaining the context of the primary body of data. This may include dynamically decreasing typesize of lines in the region near the annotation tag, intraline or interline intercalations of auxiliary symbols, words, or sentences. Numbers, words, lines, paragraphs, graphical elements, spreadsheet cells, or margins can be moved to make room for constraint data and the annotations.

As those skilled in the art will appreciate, methods of the present invention can be employed to aid in creating or modifying a constraint graph or the primary body of data, or creating various marginal notes, interlineations, graphics, handwriting, and other suitable annotations to the spreadsheet that would enhance user understanding of the spreadsheet structure. A primary body of data is displayable on a screen, permitting a user to select a region of user focus for annotation. Using a keyboard, pen operated touchpad, voice control software, or other suitable input device, the user provides supporting data input for association with the region of user focus. To aid in creating the annotation or modifying constraint data, the screen displayed body of primary data is modified to present user modifiable constraint data. Modification can include overlay type presentations in which the area to be annotated (i.e. associated with the supporting body of data input by the user) is highlighted or grayed out, or alternatively, can include spatial morphing presentation techniques in which lines of the primary body of data are moved to accommodate positioning of textual or handwriting input.

Additional functions, objects, advantages, and features of the present invention will become apparent from consideration of the following description and drawings of preferred embodiments.

BRIEF DESCRIPTION OF THE DRAWINGS

FIG. 4 is a view of the text display of FIG. 3 after selection of one of the small type annotation tags, with an expanded annotation being fitted into the cell, and with colors and boxes used to mark a transient view of the constraint graph;

FIG. 6 is a view of a gradient color marked spreadsheet;

FIG. 8 is a view a spreadsheet supporting spatially morphed textsize and handwritten annotations overlaying a grayed out portion of the spreadsheet;

FIGS. 9–10 illustrate travelling waves of color animating a spreadsheet data flow path;

FIGS. 13–20 illustrate a complex animated story for several spreadsheet data flow paths;

DETAILED DESCRIPTION OF THE DRAWINGS

Figure 1:
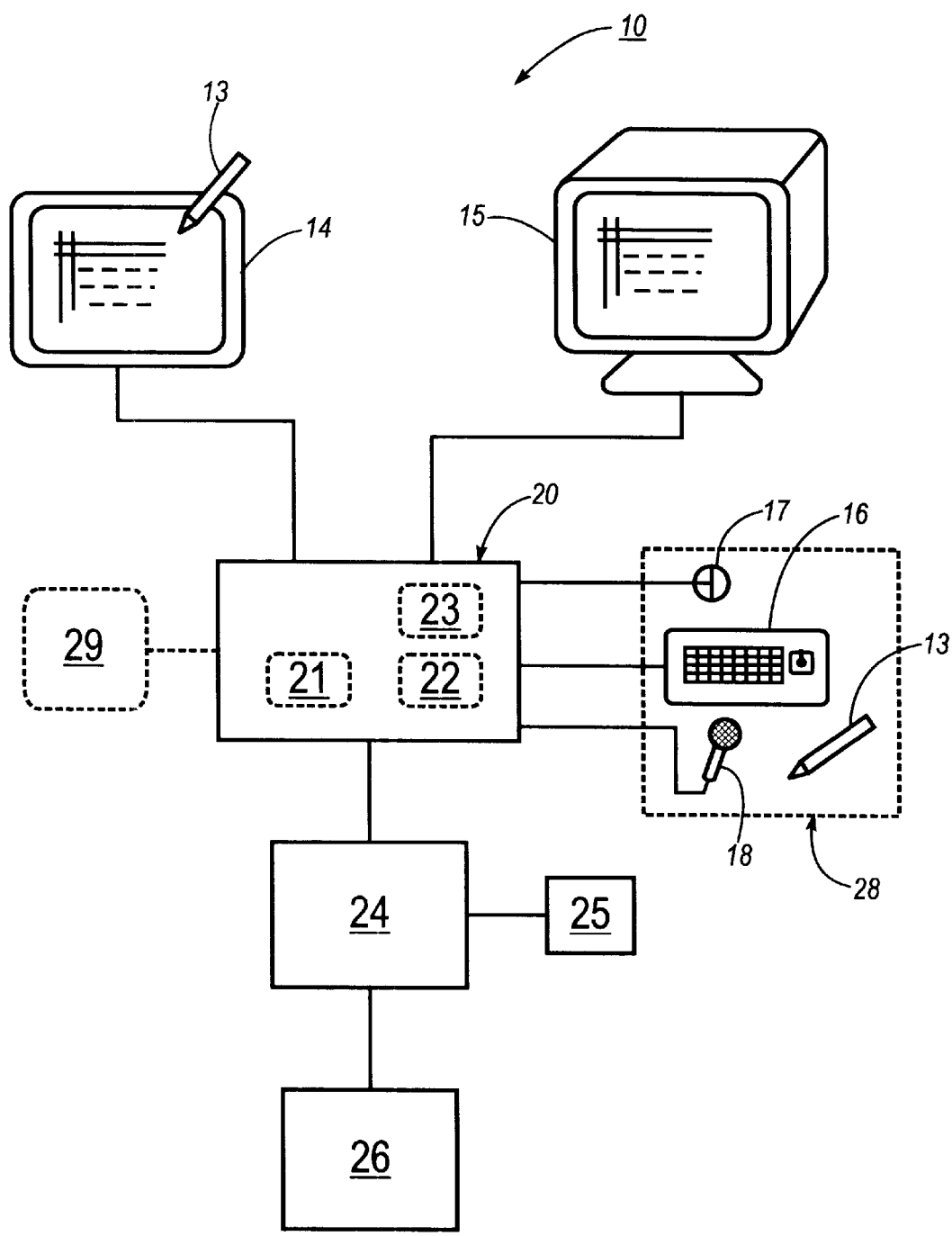
FIG. 1 is a schematic view of a computer and electronic display system suitable for operation of the present invention.

As illustrated with respect to FIG. 1, a computer system 10 includes a computer 20 connected to at least one of a cathode ray tube (CRT) monitor 15 or flat panel display 14. The computer 20 is a conventional personal computer or workstation suitable for running commercial or custom software applications in accordance with the present invention, and includes a processor 21, electronic memory 22, and long term storage 23. Input module 28 provides input to computer 20 by pen device 13, conventional keyboard 16, two or three degree of freedom mouse device 17, pen based or gestural input, paper scanning input, microphones 18 for audio input, or any other supported input mechanism. In addition to visual display output through monitor 15 or flat panel 14, various non-visual computer output is possible with output module 29, which may include but is not limited to audio output, tactile output, force feedback output (with force feedback mice or joysticks), text and graphics printers, or any other suitable output mechanism. The computer 20 can be connected to local network 24 with associated operating or archival storage 25, and can be further connected to any conventional internetwork 26 for retrieval or dissemination of data.

For purposes of the present invention, one can use high quality CRT monitors, passive or active matrix liquid crystal flat panel displays, various plasma, electrooptical, or microoptomechanical displays, or any other conventional visual display as a display 14 and 15. Good results are obtained by use of 19 inch or better diagonal CRT monitors that can support 1280 by 1024 pixels. Even better results can be obtained by use of amorphous silicon, active matrix flat panel displays, such as sold by dpiX, Inc. of Palo Alto, Calif.

For example, one suitable dpiX flat panel display has a 13.5 inch diagonal size, with viewable display area of 276 mm by 200 mm, and 3072 by 2240 pixels to support a resolution of about 300 dpi with 16 gray levels. Such high resolution displays are capable of legibly presenting textual information with a font pitch as low as 3 points, although 4 or 5 point text is more typically used as a lower limit of font size to minimize eyestrain. These displays can be connected to a PCI controller card coupled to computer 20, and currently are supported by the Windows NT computer operating system. As will be appreciated, any of the foregoing displays can be used in conjunction with various absolute or relative position sensitive touchpads or writing tablets (which may optionally overlay the display or be separately connected to computer 20) to allow direct annotation of the screen through conventional pen based input techniques.

Figure 2:
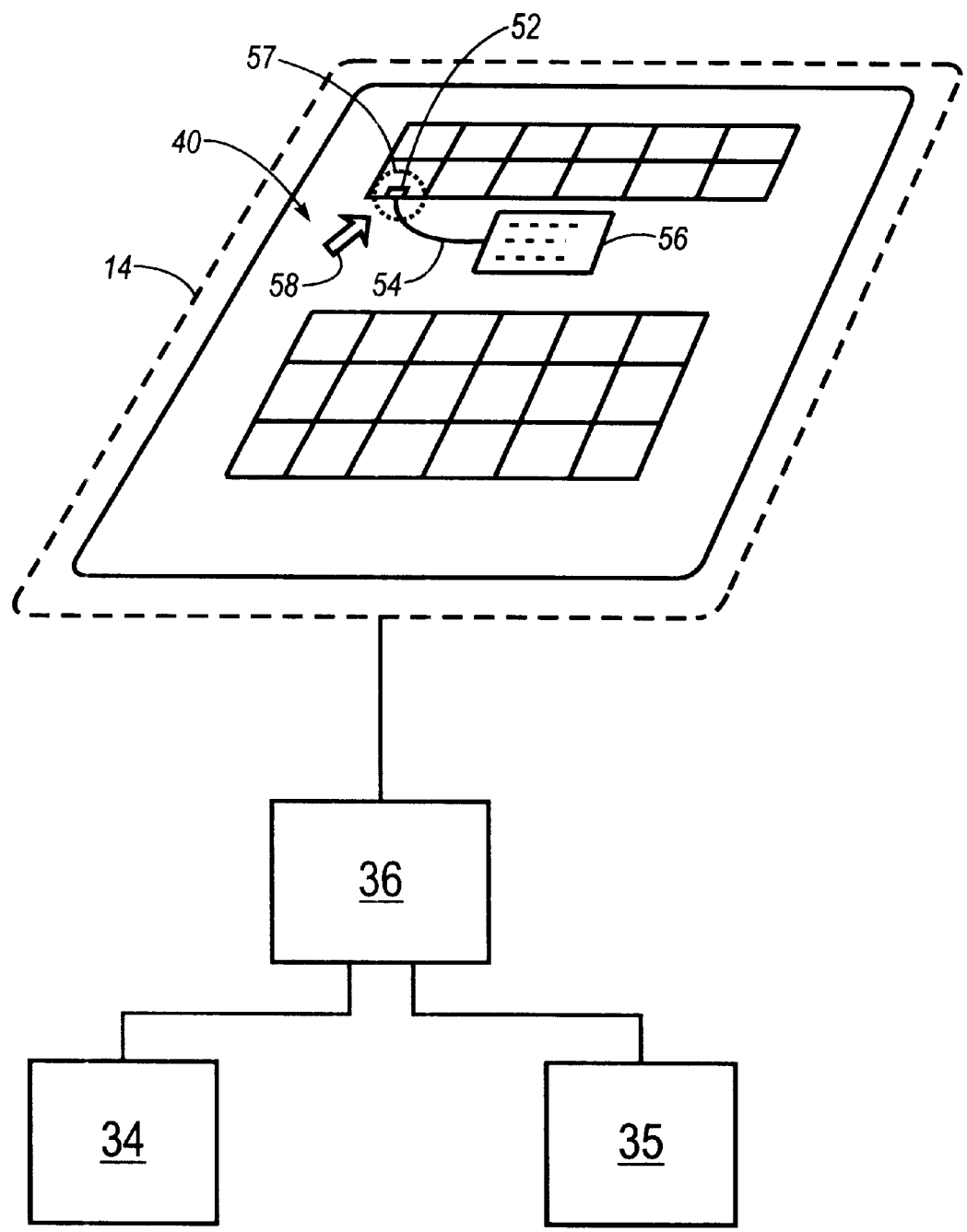
FIG. 2 is a schematic view illustrating a spreadsheet display.

As seen in FIG. 2, a physical display 14 (previously illustrated in FIG. 1) presents a computer controlled enhanced spreadsheet display 40 consisting of multiple spreadsheet cells logically linked by an underlying constraint graph. The enhanced spreadsheet display 40 is created in part by negotiation (using negotiation module 36, a software module executing on computer 20 of FIG. 1) between a primary body of data containing spreadsheet data and constraint graph information (represented by box 34) and a supporting body of data containing additional graphical or textual information that can be optionally associated with the primary body of data (represented by box 35). Movement of the mouse cursor to point at a first spreadsheet cell position (indicated by mouse controlled arrow 59) triggers launch of various symbolic connectors, color coding, or animations for conceptually linking cells in accordance with the constraint graph. Movement of the cursor away from the indicated cell into a second spreadsheet cell optionally triggers closure of the symbolic connectors, color coding, or animations associated with the first cell, and triggering of those symbolic connectors, color coding, or animations associated with the second cell. Typically, triggering display of constraint graph related information only requires moving the mouse cursor to point at a cell for a limited duration (e.g. about a tenth of a second to several seconds, although about a second is usual), with certain embodiments of the invention requiring an additional mouse click, a keyboard input signal, a keyboard or audio based mode switch, or other suitable control scheme.

In addition to enhanced animations, color changes, or graphical symbols, that provide cues for interpreting the constraint graph of selected portions of the spreadsheet 40, both readable annotations and authoring annotations are contemplated within the scope of the present invention. As can be seen in FIG. 2, an annotation tag 52 associated with a spreadsheet cell can be selected by moving a mouse operated cursor 58 into a region of user focus 57 in the vicinity of an annotation tag 52, initiating an animated launch sequence that results in display of a textual annotation 56. In response to positioning a mouse cursor 58 in the region of user focus, a "callout" annotation 56 with callout line 54 expands outward from the annotation tag 52, with the spreadsheet moving apart (spatially morphing) to accommodate the textual annotation (which may be constraint graph formulas, authored annotations, or other explanatory information useful for evaluating spreadsheet design) between rows of the enhanced spreadsheet 40.

The expansion animation for an annotation typically takes anywhere from about a quarter second to about two seconds, allowing a user to keep visual track of the expanding annotation and maintain proper contextual focus. When user focus changes by movement of the mouse cursor, the annotation tag is replaced and the primary body of data reverts to its original format by a reverse, contracting animation. As will be appreciated, the animation speed can be fully controllable, with high speed "pop-up" display annotations being presented for brief annotations, and longer animations being used for more complex annotations positioned far from the annotation tag.

As will be appreciated, supporting data 35 shown in the spreadsheet display 40 can include text, graphics, or mixtures of textual and graphical elements. Supporting data 35 can optionally include annotations consisting of a brief explanation positioned in the margin or between the lines of the displayed primary body of text. An annotation can include a description of a hypertext linked destination, an actual excerpt from the linked destination, the relationship of the linked destination to the source material, an annotation on the source material, meta-information such as author and creation date, hyperlink popularity or recommendation data, and combinations of these as well as other information. Authored annotations may include footnotes, cross-references, parenthetical statements, bibliographic references, current section, page numbers, figures, tables, sidebars, tables, copyright, or definitions. Personal annotations can include corrections, additions, deletions, notes, reviewer's comments, or bookmarks within a page. Hierarchical information such as mathematical proofs, outline subheadings, tables of content, diagram callouts, or step by step instructions may also be suitable for some embodiments of the invention. In certain embodiments, logical or relational structures such as may be provided by character or paragraph formatting, or spreadsheet constraint graph information, can be used to enhance understanding of the primary body of data 35.

Similarly, the annotation tag can be primarily textual, primarily graphical, or some mixture of textual and graphical elements. Contemplated annotation tags include numeric tags (e.g. footnote numerals), greeked or unreadably small interlinear or marginal text, symbols (e.g. an asterisk or star shaped symbol) or thumbnail graphics or drawings in the margin. In certain preferred applications, the annotation tags can be a very small, yet still readable, version of the supporting body of data. For example, the annotation can be a clipped version of the supporting body of data, showing just the first line or first few words as 3, 4, or 5 point type, when the primary body of data is presented as 12 point type. During the scaling animation, as the supporting body of data becomes more salient, the font scales up (gradually or over the course of a second or two) showing more and more lines in an increasing font point size. Alternatively, the information can be summarized; for example, showing a summary phrase or title. Again, as the supporting material scales up in response to user focus, the summary is replaced with the full text.

In certain applications the annotation tag can be visually imperceptible to the user until a pointer or other indicator of user focus is directed at a region about the annotation tag. For example, annotation tags can be based on auditory or tactile feedback such as may be provided by non visual output module 29 of FIG. 1, with, for example, sound, operation of force-feedback mice, or tactile displays providing audio or tactile annotations.

In addition to displayed mouse or keyboard controlled pointers or cursor 58, user focus can be determined by use of input module 28 and any optionally associated touch sensitive overlays to a screen display, eye or head tracking systems, or any other conventional mechanism for reliably determining a region of a screen display. Initiating dynamic display of supporting information at the user focus can be in response to user-initiated mouse clicks, keyboard input, finger taps, duration (e.g. mouse cursor held still on or adjacent to an annotation tag for a tenth of a second to several seconds, with about one second typical), or any other suitable input scheme for confirming a user desire to view supporting bodies of data such as constraint graph information or annotations.

As those skilled in the art will appreciate, modification of the primary body of data (in response to user focus) to enhance presentation of the supporting body of data with constraint graph information or annotations requires accommodating the supporting body of data within the primary body of data. Accommodation requires that the supporting body of data "negotiate" with the primary body of data (using negotiation module 36) to determine suitable adjustments to position, orientation, sizing, coloring, or other typographical or graphical characteristics of the primary or supporting body of data. A brief animation is displayed after a user indicates interest in an annotation tag, typically involving expansion of the annotation and concurrent overlay or spatial and positional morphing of the displayed primary body of data.

Advantageously, accommodation allows supporting data to be presented at full readable size, while still retaining the context of the primary data. In effect, methods in accordance with the present invention mediate the relative salience of primary and supporting data. In the beginning, the primary data is the focus and takes up most of the space and most of the user's attention. The supporting data is hinted at by graphical cues (e.g., layout of the spreadsheet, or an annotation tag that is a small type version of a constraint graph formula). When the user focuses on the supporting data, it will change itself graphically to become more salient: increasing its size, moving to a prominent location, displaying in boldface, etc. The primary data concurrently adjusts itself to become less salient: decreasing its size, moving away from the center, fading out to a lighter shade.

As will be appreciated, the specific implementations and design parameters used during negotiation between the primary body of data and the supporting body of data are dependent on the particular application and are an area of graphical design. The primary body of data (e.g. the spreadsheet) and supporting body of data (e.g. the constraint graph information, or various annotations) can be modified by various overlay techniques in which the primary body of data does not substantially change its original size, space, or position, or by various spatial morphing techniques in which the primary body of data does substantially change its original size, space, or position. Overlay techniques advantageously minimize disorientation of the user by minimizing changes to the displayed primary body of data, while spatial morphing techniques can enhance recognition of the supporting body of data and generally allow more information from both the primary body of data and supporting body of data to be concurrently presented on a display.

To aid understanding of the present invention, various strategies for selectively modifying the primary and supporting body of data can be used, including making space by modification of:

1) Position, with primary body of data moved out of way; and supporting data takes its place.

2) Size, with the primary body of data shrinking down as supporting data concurrently grows up.

3) Color, with the primary body of data changing to a lighter shade as supporting data scales up (in size) and becomes darker; allow supporting data to overlap.

4) Distortion, with the primary body of data squashed or stretched in vertical or horizontal directions, or otherwise distorted to make room for supporting data.

Space in the primary body of text can be altered in a local area (to produce a lesser overall perturbation), or in a remote area (keeping the local area, presumably the area of interest, more recognizable, and less perturbed). Alterations to the display (e.g. animations of an expanding margin callout or resizing annotation text) can be initiated by use of a pen stylus/mouse to click on supporting material to be expanded; by holding the pen stylus/mouse on supporting material, which grows (potentially revealing more information as well as becoming larger) as long as the pointer continues to stay over it; by moving the pen stylus/mouse over display so that when it lingers at any one point, the supporting body of data begins to expand (moving point of focus); by having the data remain expanded when the pen stylus/mouse moves away, allowing multiple points of focus, and having the data shrink down again when appropriately toggled or user focus changes, or by any other suitable user controlled operation.

As will be appreciated, the foregoing methods for accessing contents of a spreadsheet cell or any associated annotations can be implemented through various temporal and mode-dependent user-controllable mechanisms. One particularly useful mechanism for viewing constraint graphs or animations can be termed "transient" viewing. Transient viewing techniques allow a user to see the whole or a part of a constraint graph associated with the current connected cell with which the user is interacting. Incoming cells that affect the current cell and outgoing cells that are affected by the current cell are visualized as long as user focus is maintained on the cell. Incoming cells are those to which the formula (i.e. specific portion of the constraint graph) of the cell refer, and outgoing cells are those to which the value of the cell is referred. These two kinds of cells can be distinguishable by using color, line thickness, or some other user perceptible characteristic (including symbolic elements, color, lines, auditory, or even tactile). For example, in one implementation, each group of incoming cells can be enclosed by a rectangle while outgoing cells are filled with gray. Advantageously, the user can specify the current cell just by moving the mouse cursor on the cell. When the cursor comes in a cell, the data flow graph associated with the cell (i.e. those incoming cells and outgoing cells that together form a portion of the constraint graph for the spreadsheet) gradually appear on the screen (fades in), and it gradually disappears when the cursor moves away from the cell (fades out). The user can explore the data flow graph structure of a spreadsheet simply by moving the cursor around the spreadsheet. Typically, a transient interaction mode ends when a user clicks a cell. The current cell is fixed on the cell, and the system enters an editing mode to edit the constraint graph formula or to modify the data flow structure of the constraint graph associated with the cell.

While the transient presentation has many advantages, it can limit a user to viewing the data flow graph associated with a single cell (or a small number of cells serially invoked and toggled to maintain a view even after the cursor is moved away from the cell). In certain embodiments, it may be useful to view the entire spreadsheet constraint graph structure at once without moving the cursor to each cell in a spreadsheet. For example, one may want to quickly review the entire structure when handed a spreadsheet created by another user. Using a "whole structure view", all data flow graph structures for all displayed incoming and outgoing cells of every cell, appears on the screen. For example, one can assign different colors to rows and columns for better illustrating vertical or horizontal data flow structure. As a result, the user can quickly see how the sheet is structured, facilitating appreciation of overall spreadsheet constraint graph structure and any data or constraint graph editing.

Although the whole structure view works well to visualize the overall structure in simply designed spreadsheets, for other spreadsheets in which multiple cells are multiply constrained, or in which the constraint graph overlaps tightly in visually confusing ways, the whole structure view may not be as useful. For such complex spreadsheets, the use of animation can greatly enhance understanding of the whole or a part of the constraint graph structure of the spreadsheet. Flows of cell values start at initial cells, join and split at intermediate cells, and end at terminal cells (typically a column or row addition or subtraction). This sequence can be termed a "story" of the data flow graph, and can be presented as a series of color or symbolic animations. Choosing a story (i.e. animation order of the data flow graph) can be based on cell constraint graph, cell contents, spreadsheet annotations and layout, or any other suitable mechanism for clarifying spreadsheet cell associations and providing an interesting or pleasing graphical effect.

Figure 3:
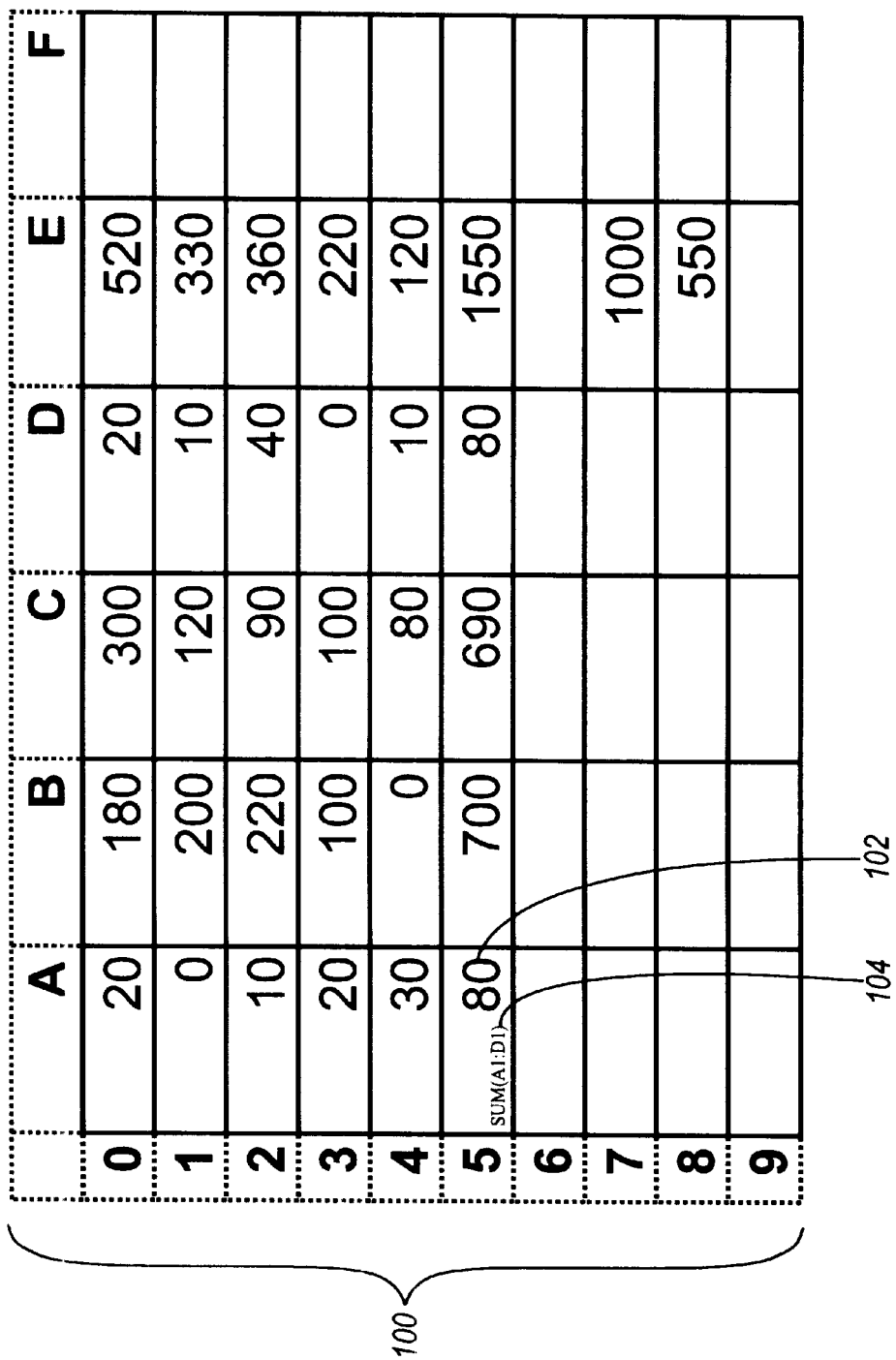
FIG. 3 is a sample view of a spreadsheet having small type annotation tags.

To better understand the various claimed methods and techniques for displaying constraint graph information and annotations through transient display techniques, whole structure views, or animations, FIGS. 3–22 are hereafter discussed. As seen in FIG. 3, a spreadsheet 100 includes a primary body of numeric data 102 that is defined in whole or in part by an underlying constraint graph. A portion of that constraint graph is indicated by annotating formulas 104 present as a small type formula in the corner of a cell. The annotating formulas can be continuously present, present when transiently triggered by a mouse or other input device, or present when toggled by a suitable keyboard input. In preferred embodiments a high resolution display is used to allow the formulas 104 to be presented in legible 3, 4, or 5 point type, while the numeric data is presented in a conventional 12 point typeface. However, as will be appreciated, if numeric data is presented in large 18 point typefaces, it may be possible to present the formulas 104 in 8 point typefaces legible on currently available CRT monitors or other suitable display.

As seen in FIG. 4, when a user controlled mouse cursor 105 is transiently moved over a particular cell (i.e. cell E3), that cell's underlying constraint structure is graphically presented. The column members (in column E) linked by the constraint graph to the mouse selected cell are boldly outlined in a rectangular box, while row members (in row 3) are lightly outlined in a second rectangular box. In addition, the summation cell (E5) in which the selected cell is a constraint graph member is colored or gray shaded. If the mouse is moved to a position indicated by arrow 106, additional annotation information can be supplied by a transient overlay of a constraint graph formula, with the small type annotation having its typesize increased until it barely fits into cell (A5). As will be appreciated, the cell size could be expanded by spatial morphing if necessary to accommodate the enlarged formula 104 and the numeric data 102.

As those skilled in the art will appreciate, the graphical presentation of constraint structure such as discussed in connection with FIG. 4 need not be limited to the direct inputs and outputs associated with a cell. Multiple and/or successive levels of ancestors and descendants could be shown, possibly with different color shadings or other graphical features distinguishing each level from the preceding or following. Users could be given ways to control how many levels they wish to see at a given time, and successive clicks could add or remove levels from the evolving presentation as desired.

For example, when the user controlled mouse cursor 105 is transiently moved over cell E3, the input cells in row 3 may each contain formulas. Given cell E3, there is a substructure of the constraint structure that represents all the cells in the spreadsheet that ultimately input values to the calculation of the formula in cell E3. There is a similar substructure for the output cells of E3. All or part of these substructures can be graphically presented. Furthermore, even portions of the constraint structure that are not part of these substructures can be graphically presented. For example, if cell E3 participates in a summation, other summations in the spreadsheet with similar structure can be presented when the user controlled mouse cursor is transiently moved over cell E3.

Figure 5:
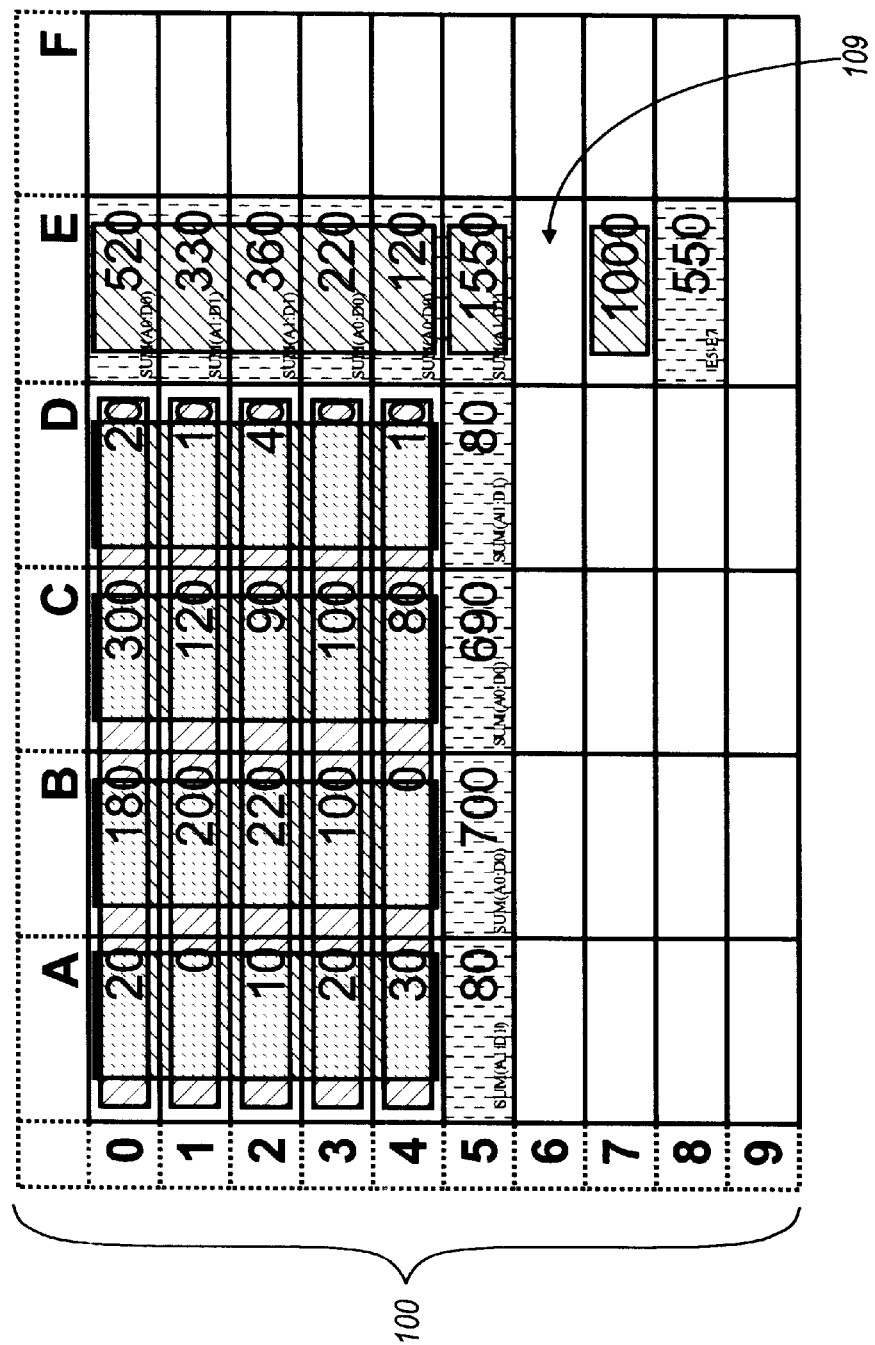
FIG. 5 is a sample view of a whole structure constraint graph spreadsheet view.

As seen in FIG. 5, a whole structure view of a spreadsheet 100 shows all data flow graph structures for all displayed incoming and outgoing cells of every cell. Different colors 109 in each of the rows and columns indicate vertical or horizontal data flow structure. As a result, the user can quickly see how the sheet is structured, facilitating appreciation of overall spreadsheet constraint graph structure and any data or constraint graph editing.

FIG. 6 illustrates an alternative method for displaying a data flow path on a spreadsheet 110 using gradient color 119. If a user controlled mouse cursor 115 selects a cell (E0), the incoming cells (row 0) and outgoing cells (column E) related to the selected cell (E0) are overlaid with a gradient color that smoothly increases in hue, gray level, saturation, or other user perceptible color variation. For example, cell (A0) could be a pale blue, cell (E4) be a dark blue, and the cells in the constraint graph determined data path therebetween having a gradually increasing blue saturation.

Figure 7:
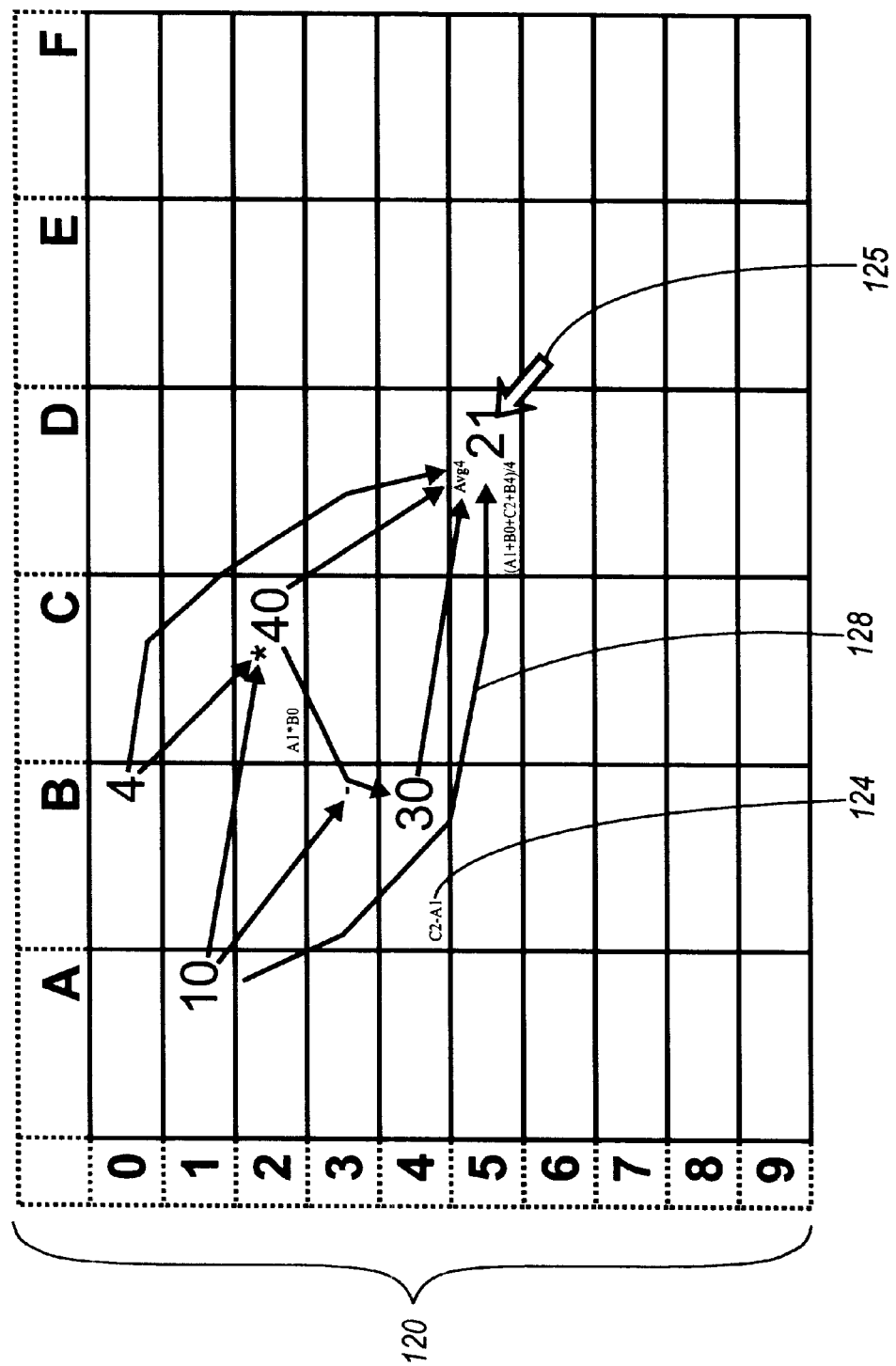
FIG. 7 is a view of a line symbol marked spreadsheet.

Still another method for displaying a data flow path on a spreadsheet 120 is illustrated with respect to FIG. 7. If a user-controlled mouse cursor 125 transiently selects cell (D5), all constraint graph related cells are linked by arrows 128, and annotating formulas 124 are concurrently displayed. Advantageously, such a view allows a user to quickly appreciate complex diagonal or arbitrary spreadsheet cell constraint graph relationships, without requiring multiple mouse clicks, mouse movement, or viewing of formulas in formula boxes separate from the context of each spreadsheet cell.

FIG. 8 illustrates a spreadsheet 130 supporting spatial morphing of numeric data 132 to accentuate a data flow path 138 (along row 3 and down column E). In response to transient selection of cell (E3) by mouse cursor 135, the cells comprising the data flow path expand in size, with the typesize of the contained numeric data correspondingly increasing. To further enhance user appreciation of the data flow path 138, the remaining cells decrease in size, with size of those cells spatially farthest from the data flow path 138 decreasing the most. The spreadsheet can be also enhanced with explanatory annotations, including a gray out overlay providing space for a handwritten explanatory annotation 131 (with a digital pen system or other suitable electronic pen writing mechanism), and a margin callout overlay 133 providing an annotation in a margin of a spreadsheet display.

As previously discussed, animations invoked by transient user focus can also help identify spreadsheet structure. For example, as seen in FIGS. 9 and 10 (which represent temporally distinct views of a spreadsheet 140) a spreadsheet having constraint formula annotations 144 also supports colored travelling waves of animation 149. Selection of column (E) causes incoming and outgoing cells to have a moving wave of gradient color that attracts a users attention to the underlying constraint structure of the spreadsheet 140.

Figure 11:
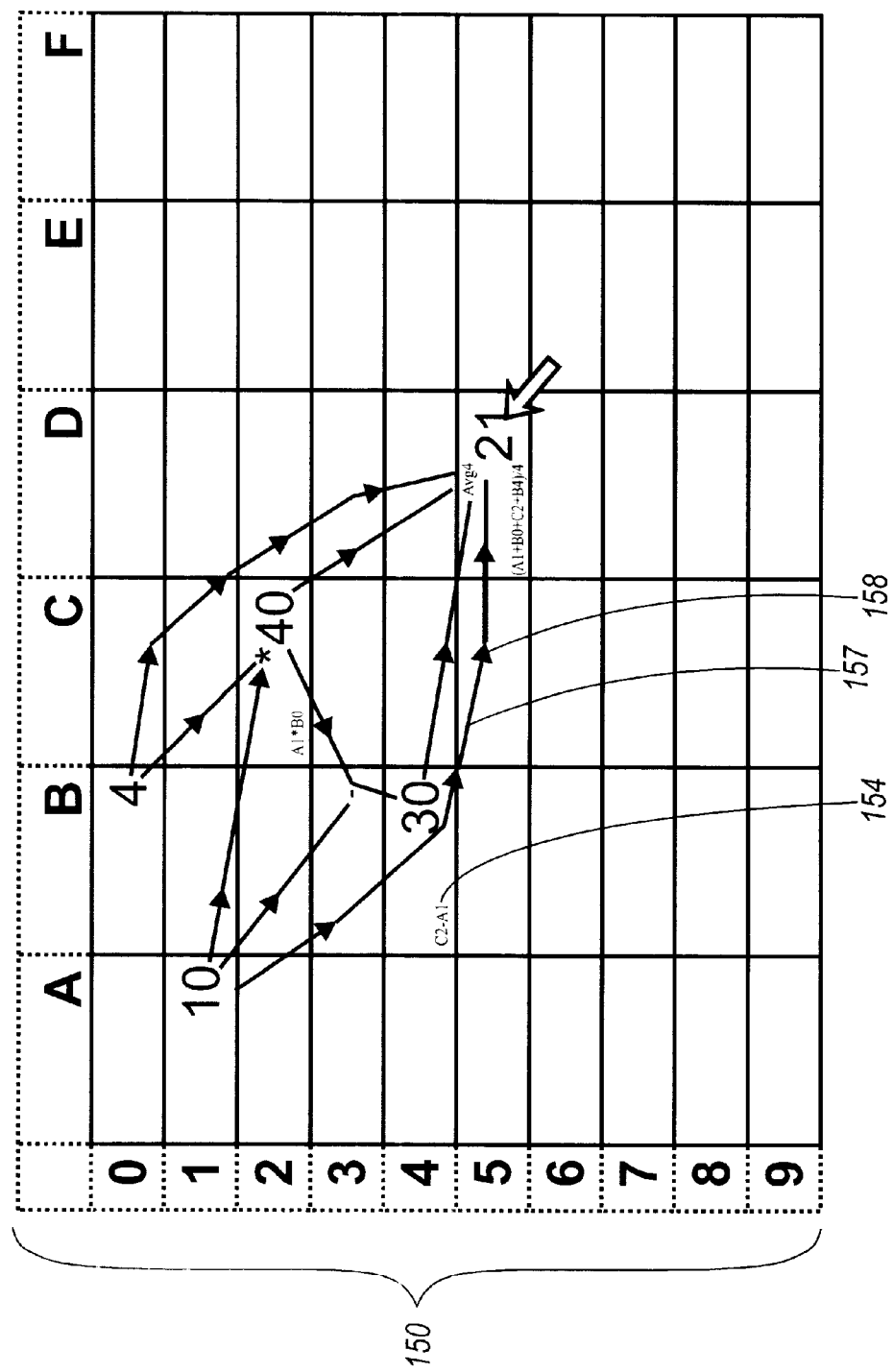
FIGS. 11–12 illustrate travelling arrowheads animating a spreadsheet data flow path.
Figure 12:
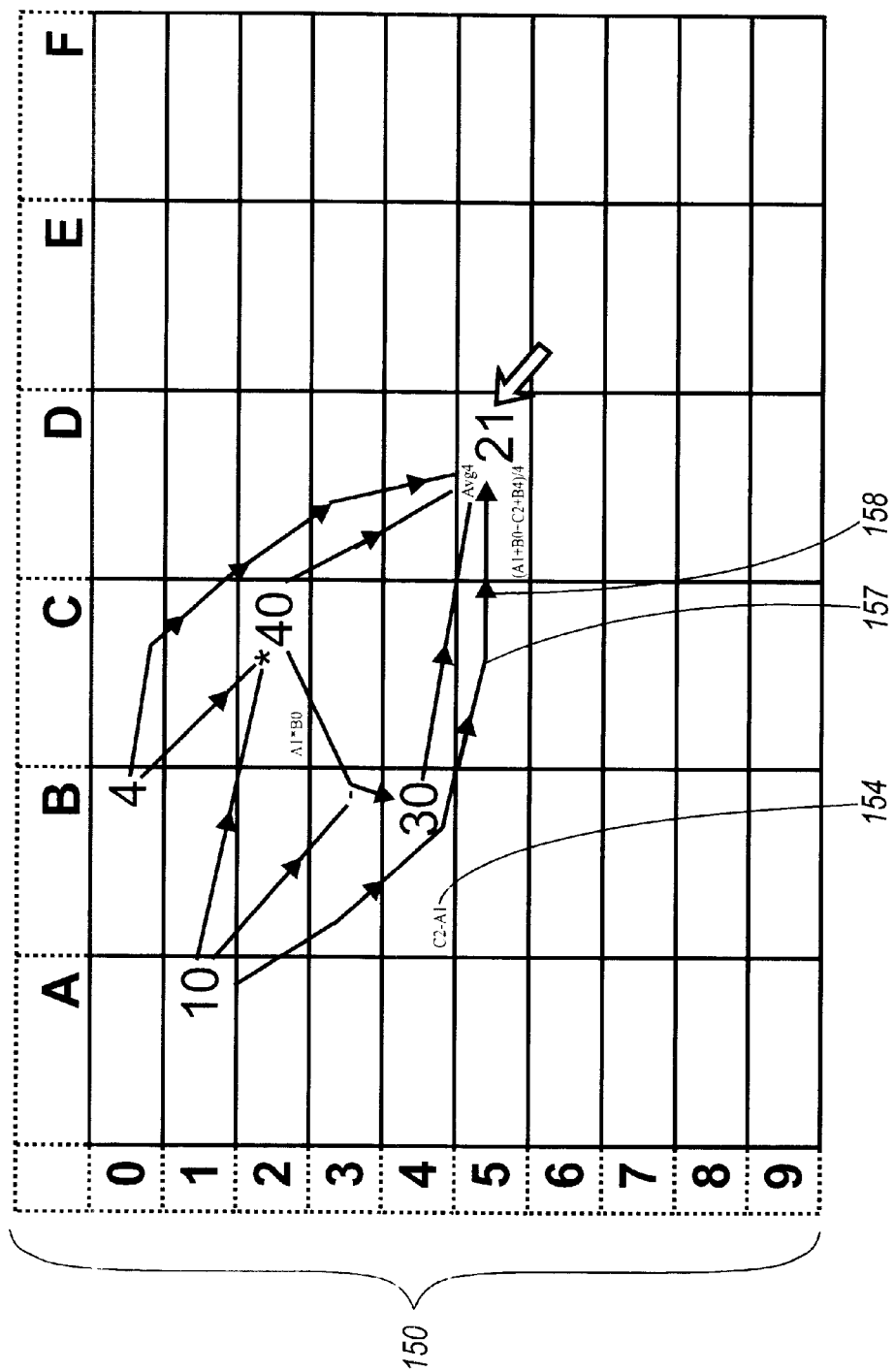

Similarly, as seen in FIGS. 11 and 12 (which represent temporally distinct views of a spreadsheet 150) a spreadsheet having constraint formula annotations 154 also supports travelling arrowheads 158. Selection of cell (D5) causes all constraint graph linked cells to be linked by lines 157 that have animated arrowheads 158 moving to attract a user's attention to the underlying constraint graph structure of the spreadsheet 150.

Figure 17:
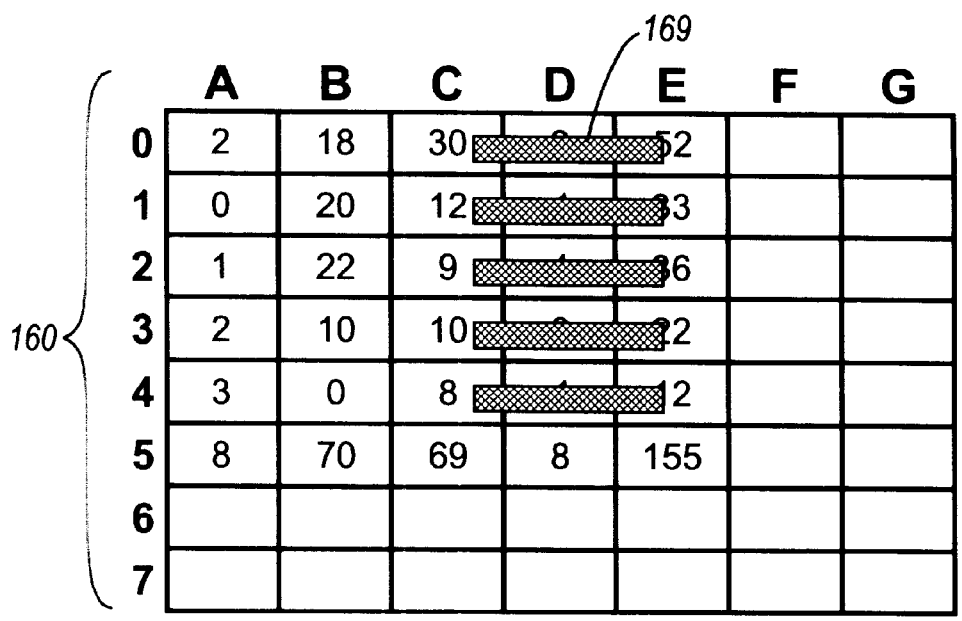
Figure 18:
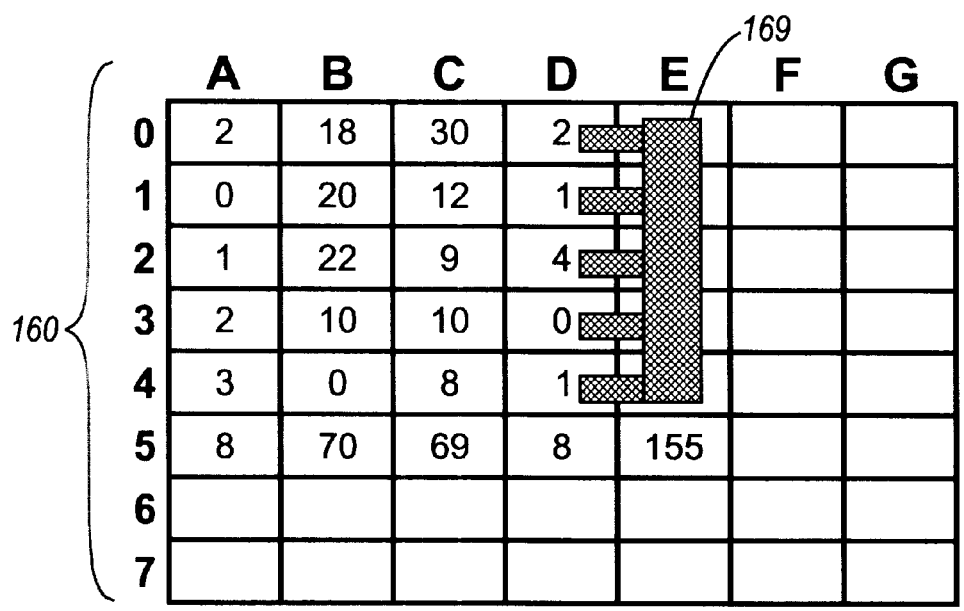

FIGS. 13–20 are yet another animation "story" that illustrates complex constraint graphs through animation linkages that include colored or symbolic animation of spreadsheet cells and temporal progression through various selected paths of the constraint graph. As seen in FIG. 13, in response to a user-initiated selection asking for an overview of the constraint graph spreadsheet 160, various colored cells 169 are transiently produced. Based on the columnar orientation of the colored cells, a user would realize, for example, that the colored cells are connected by an underlying constraint graph. As the animation proceeds in FIG. 14, a user sees that relations in columns (A, B, C, and D) flow into row (5), which cell of which can be a summation or product of the column of cells above. In FIG. 15, the story continues by illustrating the constraint graph linkage of cells positioned respectively along the rows (0, 1, 2, 3, and 4), while still continuing the column animation. In FIG. 16, the column animation has almost disappeared, while the row animation proceeds to show the relations of the rows to column (E). In FIG. 17, the column animation has disappeared, while the row animation proceeds. In FIG. 18, animation of column E begins, while FIGS. 19 and 20 respectively illustrate the constraint graph of cell (E5). As will be appreciated, this overlapping sequence of animations, which may take only 3 or 4 seconds to complete, effectively provides a user with an overall understanding of the constraint graph linkages that help define the spreadsheet 160. In addition, suitable modifications to the temporal progression of the foregoing animation (or any other discussed animation) can be made, including, for example, concurrent or substantially simultaneous display of two or more constraint paths, or sequential, non-overlapping animations. Animations display times can also be increased to greater than two or three seconds, or decreased to less than two or three seconds as required.

To better understand operation of the present invention as exemplified in FIGS. 13–20 and FIG. 5, the following pseudocode describing implementation of a particular embodiment is presented:

```
// show the entire structure of the spreadsheet
def showstructure( ):
    use similaritytest( ) to group formulas into similarity
        clusters
    foreach formula f in the spreadsheet:
        oc=the output cell of the formula
        fcs=the input cells of the formula
        foreach group of spatially adjacent cells in fcs:
            form a new rectangular extent around the group
            inset the extent by 10% of the width of a cell
            fill the extent with a translucent color specific to the
                formula's similarity cluster
            draw a line connecting the extent to oc
def similaritytest(f1, f2):
    f1 and f2 are similar if the operations are the same, and the
        set of cells involved in f1 can be translated as a group
        to form the set of cells involved in f2
// show an animation illustrating the entire structure of the
    spreadsheet
def animatestructure( ):
    find all the cells in the spreadsheets that contain data but
        not formulas
    build a constraint graph starting from those cells and the
        formulas those cells take part in: each node represents
        a cell, and each edge of the graph represents a formula
        connecting an input of the formula and the output of the
        formula. (thus the same formula will be represented
        along multiple edges, one for each input.)
    place the formulas into an ordered list of groups such that
        for any group g, the inputs to the formulas in group g(i)
        are either data cells (not formula cells) or are output
        cells of formulas in an earlier group
    optimize the ordered list of groups by combining groups
        when possible foreach group g:
    use similaritytest( ) to group the formulas in group g into
        similarity clusters
    rects={ }
    foreach formula f in g:
        oc=the output cell of the formula
        fcs=the input cells of the formula
        foreach group of spatially adjacent cells in fcs:
            form a new rectangular extent around the group
            inset the extent by 10% of the width of a cell
            fill the extent with a translucent color specific to the
                formula's similarity cluster
            add the extent to rects
    foreach rectangle r in rects, simultaneously:
        start an animation going by shrinking the rectangle and
            moving it towards its associated formula's output
            cell
        continue animating the rectangles until they are nearly
            the size of a cell and positioned nearly at the output
            cell destination
        then begin the next group g, allowing the current
            animation to expire and erase when the rectangles
            are at the output cell
```

Figure 21:
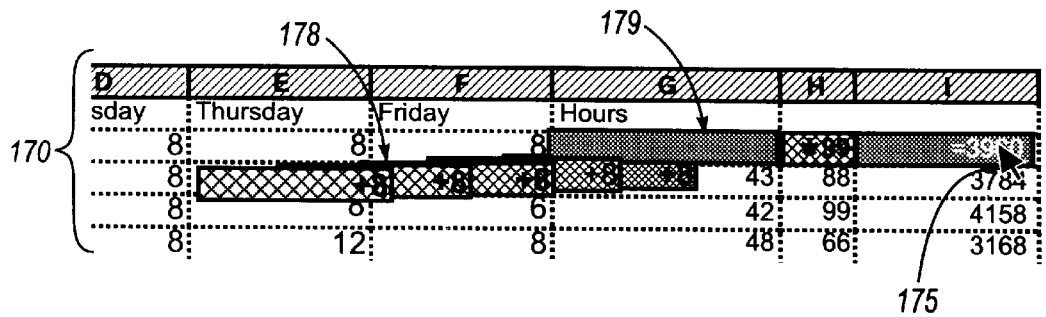
FIG. 21 illustrates an alternative spreadsheet data flow path With apparently three dimensional, gradient colored cell drop shadow movement.

FIG. 21 illustrates another graphical and animation technique suitable for enhancing a spreadsheet view by animated linkages. As can be seen in FIG. 21, a spreadsheet 170 supports animated cells 178 (with gradient colors 179) that appear to have a three dimensional "drop shadow". In response to user selection of a cell with cursor 175, the cells, now appearing to be cards that float over the spreadsheet 170, can move under or over other cells to indicate their relationship. They move over non-participating cells, but under participating cells or into result cells. The movement itself can be choreographed and timed to suggest different data relationships. In FIG. 21, cells stack up to suggest a process of summing up. The data cells first land in the hours sum (G), then the hours sum moves together with the hourly rate (H) to generate the final result, a total of wages for hours worked. The movement occurs in arch form so the moving cells do not obscure relevant portions of the spreadsheet. The arch alternates, under the row for the first part of the formula, and above the row for the second part of the formula.

Figure 22:
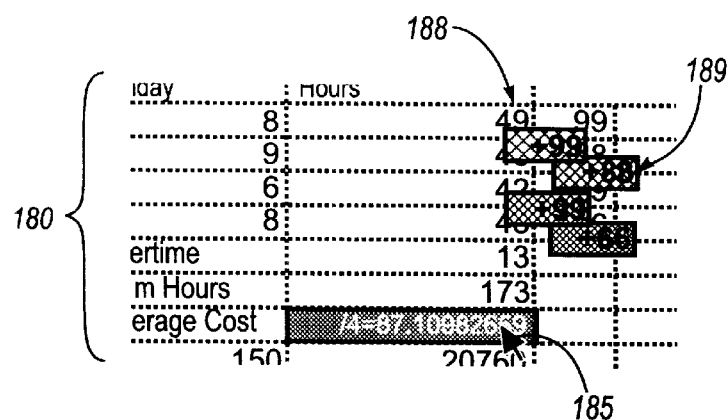
FIG. 22 illustrates yet another spreadsheet data flow path with apparently three dimensional cell animation.

Alternatively, as seen in FIG. 22, a spreadsheet 180 could support color gradient 189 animated drop shadow cells 188. In response to user selection of a cell with cursor 185, the cells 188 are "juggled" by moving back and forth with a gradually decreasing frequency until they stabilize. A user's attention would be captured by the movement, and this transient animation and concomitant gradient color coding would suggest that the animated cells 188 are linked by a constraint graph.

To better understand operation of various aspects of the foregoing described embodiments of the invention, the following pseudocode describing implementation of a particular embodiment of the present invention is presented:

```
// Transient local viewing techniques,
// Moving mouse over a cell shows three levels of the
   constraint graph,
// centered around the current cell "this cell":
// (a) its immediate inputs (i.e., the cells whose value directly
   affect it),
// termed "in cells";
// (b) its immediate outputs (i.e., the cells whose value it
   directly affects),
// termed "out cells"; and
// (c) the other cells that participate in each formula of (b),
   termed "fellow cells".
// The effect showing these relationships may be:
// outline, connect, gradient, wave, dash.
def on_mouse_over(effect, thiscell):
    i1=in_formula_list(thiscell) // i1 is a set of cells directly
        affecting thiscell
    gi1={ }
    for each group of spatially adjacent cells in i1:
        form a new rectangular extent around the group
        add this extent to gi1
    o1=out_formula_list(thiscell) //
    o1 is a set of pairs (fellowcells, outcell)
    // outcell contains a formula that includes thiscell
    // fellowcells is a set of cells that participate in outcell's
        formula
    go1={ }
    for each pair p in o1:
        for each group of spatially adjacent cells in p.fellow-
            cells:
            form a new rectangular extent around the group
            add this extent to go1
    switch:
        case effect=outline:
            for each g in gi1:
                draw a rectangular outline around g with color
                    inputcolor
            fill thiscell with color thiscolor
            for each g in go1:
                draw a rectangular outline around g With color
                    fellowcolor
            for each pair p in o1:
                oc=p.outcell // the output cell of the formula
                    represented by p
                fill p.outcell with color outputcolor
        case effect=connect:
            for each gin gi1:
                draw a rectangular outline around g with color
                    inputcolor draw a line from the edge of g to
                    thiscell
            draw a rectangular outline around thiscell with color
                thiscolor
            for each pair p in o1:
                oc=p.outcell // the output cell of the formula
                    represented by p
                draw a rectangular outline around oc with color
                    outputcolor
                draw a line from the edge of thiscell to oc
        case effect=gradient:
            for each g in gi1:
                fill g with a gradient from white to inputcolor,
                    using the spatial direction from g to thiscell as
                    the gradient direction
                fill thiscell with color thiscolor for each g in go1:
                oc=the output cell of the formula partially repre-
                    sented by g
                fill g with a gradient from white to fellowcolor,
                    using the spatial direction from g to oc as the
                    gradient direction
                fill oc with color outputcolor
        case effect=wave:
            for each g in gi1:
                fill g with the pattern inputpattern
                dir=spatial direction from g to thiscell
                begin a continuous animation consisting of shift-
                    ing the pattern within the confines of g in
                    direction dir
            fill thiscell with color thiscolor
            for each g in go1:
                oc=the output cell of the formula partially repre-
                    sented by g
                dir=spatial direction from g to oc
                fill g with the pattern fellowpattern
                begin a continuous animation consisting of shifting
                    the pattern within the confines of g in direction dir
                fill oc with color outputcolor
        case effect=dash:
            for each g in gi1:
                draw a rectangular outline around g with color
                    inputcolor
            for each s in i1:
                draw a continuous dashed line flowing through each
                    g in gi1 that is a part of s, ending in an arrowhead
                    on thiscell
                animate this line by shifting the dashes toward the
                    arrowhead continuously over time
            fill thiscell with color thiscolor
            foreach g in go1:
                draw a rectangular outline around g with color
                    fellowcolor
            foreach p in o1:
                oc=p.outcell // the output cell of the formula repre-
                    sented by s
                draw a continuous dashed line flowing through each
                    g in go1 that is a part of p, ending in an arrowhead
                    on oc
                animate this line by shifting the dashes toward the
                    arrowhead continuously over time
                fill oc with color outputcolor
def on_mouse_out(thiscell):
    stop animations started by on_mouse_over
    remove current effect drawn by on_mouse_over
def in_formula_list(c): // if cell c contains a formula,
    returns the set of all cells that // appear directly in that
    formula; otherwise returns the empty set
    s=cell c's position in the spreadsheet constraint graph
    return all cells with an input link to s
def out_formula_list(c): // returns a set of pairs
    (fellowcells, outcell), // one set for each formula that
    references cell c
    os=[] // initialize output set
    s=cell c's position in the spreadsheet constraint graph
    for each cell oc with an output link from s
        fellowcells=all cells with an input link to oc // includes
            c
        add (fellowcells, oc) to os
``` return os

As those skilled in the art will appreciate, other various modifications, extensions, and changes to the foregoing disclosed embodiments of the present invention are contemplated to be within the scope and spirit of the invention as defined in the following claims.

The claimed invention is:

1. A method for augmenting a spreadsheet presentation on a display, the method comprising the steps of selecting a region of user focus in an array of cells, wherein two or more displayed cells of the array of cells are logically linked by a constraint graph, and providing animated linkages between the two or more displayed cells logically linked by the constraint graph in response to selected user focus.

2. The method of claim 1, wherein the animated linkages are displayed as an animated sequence that includes color transitions between the two or more displayed cells.

3. The method of claim 1, wherein the animated linkages are displayed as an animated sequence that includes symbol movements between the two or more displayed cells.

4. The method of claim 1, wherein the animated linkages are displayed as an animated sequence that includes color transitions or symbol movements between the two or more displayed cells.

5. The method of claim 1, wherein the animated linkages are displayed as an animated sequence that includes drop shadow cell animations between the two or more displayed cells.

6. A method for augmenting a spreadsheet presentation on a display by demonstrating multiple constraint graph paths, the method comprising the steps of providing a first set of animated linkages along a first constraint graph path between two or more displayed cells logically linked by the constraint graph, and providing a second set of animated linkages along a second constraint graph path between the two or more displayed cells logically linked by the constraint graph.

7. The method of claim 6 wherein the first set of animated linkages and the second set of animated linkages are displayed as animated sequences between the two or more displayed cells that are concurrently presented.

8. The method of claim 6 wherein the first set of animated linkages and the second set of animated linkages are displayed as animated sequences between the two or more displayed cells that are temporally overlapped, with the second animated linkage beginning before completion of the first animated linkage.

9. The method of claim 6 wherein the first set of animated linkages and the second set of animated linkages are displayed as animated sequences between the two or more displayed cells that are temporally distinct, with the second animated linkage beginning after completion of the first animated linkage.

10. The method of claim 6, wherein the animated linkages are displayed as an animated sequence that includes color transitions between the two or more displayed cells.

11. The method of claim 6, wherein the animated linkages are displayed as an animated sequence that includes symbol movements between the two or more displayed cells.

12. The method of claim 6, wherein the animated linkages are displayed as an animated sequence that includes color transitions or symbol movements between said two or more displayed cells.

13. The method of claim 6, wherein the animated linkages are displayed as an animated sequence that includes drop shadow cell animations between the two or more displayed cells.

14. The method of claim 6, wherein the first animated linkage is initiated in response to user focus.

* * * * *